United States Patent
Hasegawa et al.

(10) Patent No.: US 7,594,241 B2
(45) Date of Patent: Sep. 22, 2009

(54) INFORMATION RECORDING MEDIUM

(75) Inventors: Tetsuji Hasegawa, Ibaraki (JP);
Hiroyuki Ota, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 477 days.

(21) Appl. No.: 11/453,909

(22) Filed: Jun. 16, 2006

(65) Prior Publication Data
US 2007/0169141 A1      Jul. 19, 2007

(30) Foreign Application Priority Data

Jun. 17, 2005   (JP)   ............................. 2005-177946
May 30, 2006   (JP)   ............................. 2006-150546

(51) Int. Cl.
G11B 7/24 (2006.01)
(52) U.S. Cl. ..................................... 720/729
(58) Field of Classification Search ................ 720/729, 720/658, 643, 645, 741, 735, 743
See application file for complete search history.

(56) References Cited

U.S. PATENT DOCUMENTS

| | | | |
|---|---|---|---|
| 6,600,706 B1 * | 7/2003 | Gotoh et al. | 369/47.15 |
| 6,786,416 B2 * | 9/2004 | Soni et al. | 235/491 |
| 2005/0099715 A1 * | 5/2005 | Yip et al. | 360/48 |
| 2006/0031868 A1 * | 2/2006 | Yamaoka et al. | 720/718 |

FOREIGN PATENT DOCUMENTS

| | | |
|---|---|---|
| JP | 2002-367336 A | 12/2002 |
| JP | 2002-373479 A | 12/2002 |

* cited by examiner

*Primary Examiner*—Allen T Cao
(74) *Attorney, Agent, or Firm*—Birch, Stewart, Kolasch & Birch, LLP (57) ABSTRACT

In information recording medium of the present invention, a medium unit on which information signals are recorded is placed in an inner space of a main-body case, and an inherent marking for representing specific data for the medium unit is provided on the medium unit.

18 Claims, 7 Drawing Sheets

INFORMATION RECORDING MEDIUM

BACKGROUND OF THE INVENTION

The present invention relates to information recording medium such as tape cartridge and magneto-optical disk cartridge.

It is publicly known to mark two-dimensional codes on an outer surface of a main-body case of a tape cartridge of single-reel type, for instance, from JP 2002-367336 A (paragraph number 0024, FIG. 2). As is disclosed therein, inherent identifying information indispensable for quality control is expressed by two-dimensional codes, which are read for each tape cartridge in production process, and thus quality control can be carried out while products are identified. Nevertheless, details of the inherent identifying information that is indispensable for quality control and that is expressed by the two-dimensional codes are not described therein and thus not obvious. A similar proposal is found in JP 2002-373479 A (paragraph number 0021, FIG. 2).

For tape cartridge, in-cassette method and out-cassette method are among manners of winding a magnetic tape on a tape reel in a tape cartridge of single-reel type. In the in-cassette method, a magnetic tape is wound on a tape reel incorporated in a main-body case. In the out-cassette method, by contrast, a magnetic tape is wound on a tape reel, and the tape reel is thereafter incorporated into a main-body case.

In the in-cassette method for winding tape, production history data, characteristic data and the like for the magnetic tape (that will sometimes be referred to simply as "tape data," hereinbelow) can be sent to a two-dimensional-code printing device in the next process, after the winding of the magnetic tape onto the tape reel incorporated in the main-body of the tape cartridge. Therefore, discrepancy is prevented between contents of the magnetic tape received in the main-body case and contents of the tape data of the two-dimensional codes printed on the main-body case.

In addition, the magnetic tape is wound on the tape reel incorporated previously in the main-body case, and therefore a database for management of production history can be produced in one process on basis of the tape data. Thus discrepancy is prevented between the contents of the magnetic tape received in the main-body case and contents of the tape data.

In the out-cassette method for winding tape, however, the tape reel wound with the magnetic tape and tape data are sent to the next process with both completely corresponding to each other, the tape reel is subsequently incorporated into the main-body case, and two-dimensional codes are printed on the main-body case in the still next process. Accordingly, there is a danger that the correspondence between the magnetic tape and the tape data may be mistaken in each case of when the tape reel and the tape data are sent to the assembly process, when the tape reel is incorporated into the main-body case, and when the two-dimensional codes are printed on the main-body case. As a result, a problem is caused in assurance of traceability (production history management) for tracing production history of tape cartridges and the like.

In the out-cassette method for winding tape, alternatively, the tape reel may be wound with the magnetic tape in a preceding process, the tape reel and tape data may be sent to the next process with both completely corresponding to each other, the tape reel may subsequently be incorporated into the main-body case, and then a database for management of production history may be produced. In that case, there is a danger that the correspondence between the magnetic tape and the tape data may be mistaken in each case of when the tape reel and the tape data are sent to the assembly process, when the tape reel is incorporated into the main-body case and, additionally, when the database for management of production history is produced. As a result, a problem is caused in assurance of traceability for tracing production history of tape cartridges and the like.

On occasion of sampling inspection during the production, troubleshooting for failure in reading and writing in use of the tape cartridge, and the like, a tape reel wound with a magnetic tape is taken out of the main-body case. On condition that two-dimensional codes have been marked on an outer surface of the main-body case as is disclosed in JP 2002-376336 A, however, the correspondence between the tape reel and the main-body case is broken off in instant of the takeout of the tape reel from the main-body case. In this case also, there is a danger that the tape data may be mistaken, and a problem is similarly caused in the assurance of traceability.

SUMMARY OF THE INVENTION

An object of the present invention is to provide information recording medium such as tape cartridge and magneto-optical disk cartridge that assures precise traceability with reliability ensured sufficiently.

Another object of the invention is to provide information recording medium in which an inherent marking provided on a medium unit can automatically be read by a marking reader device and by which inspection, examination of production history, and the like, in addition to quality control during the production, can conveniently be carried out with use of data specific to the medium unit identified from the read inherent marking.

Further another object of the invention is to provide information recording medium in which tape data can be provided and marked without danger of mistake on a tape cartridge of single-reel type irrespective of manner of winding a recording tape on a tape reel, i.e., whether the recording tape is wound by in-cassette method or out-cassette method, in which correspondence between the recording tape and the tape data can be maintained even if the tape reel is taken out of a main-body case for inspection, examination of production history, and the like, and in which precise traceability for tape cartridge can be assured with reliability ensured sufficiently.

In order to achieve the objects, according to one aspect of the invention, there is provided information recording medium including: a medium unit on which information signals are to be recorded; and a main-body case in which the medium unit is placed in an inner space thereof, wherein an inherent marking for representing specific data for the medium unit is provided on the medium unit.

In the information recording medium according to the one aspect of the invention, the medium unit may be composed of recording medium on which information signals are to be recorded and a holder body which holds the recording medium, and the inherent marking may be provided on the holder body.

In the information recording medium according to the one aspect of the invention, the recording medium may be a recording tape or a recording disk. A recording method for the recording medium may be either magnetic recording or magneto-optic recording.

In the information recording medium according to the one aspect of the invention, the holder body may face on outside of the main-body case through a driving aperture opening on the main-body case, and the inherent marking may be formed on an outer surface of the holder body that faces on the outside of the main-body case.

In the information recording medium according to the one aspect of the invention, the inherent marking may be a two-dimensional code that can optically be read by a marking reader device.

In the information recording medium according to the one aspect of the invention, the inherent marking may be a two-dimensional code that can optically be read by a marking reader device from outside via the driving aperture of the main-body case.

In the information recording medium according to the one aspect of the invention, the medium unit may be composed of a tape reel contained in an inner space of the main-body case and a recording tape wound on the tape reel, the tape reel may include a pair of upper and lower flanges and a reel boss supporting both the flanges, and the inherent marking formed on an outer surface of a bottom wall of the reel boss may face on the outside of the main-body case through the driving aperture opening on the main-body case.

In the information recording medium according to the one aspect of the invention, the inherent marking may be covered with a transparent protective coat.

In the information recording medium according to the one aspect of the invention, specific data for the medium unit that is represented by the inherent marking may include specific data for the holder body and specific data for the recording medium.

In the information recording medium according to the one aspect of the invention, the specific data for the recording medium may include production history data and/or characteristic data.

According to another aspect of the invention, there is provided information recording medium including: a medium unit composed of recording medium on which information signals are to be recorded and a holder body which holds the recording medium; and a main-body case in which the medium unit is placed in an inner space thereof, wherein an inherent marking is provided on the holder body, the inherent marking represents specific data for the holder body, specific data for the recording medium is associated with the specific data for the holder body and is stored as a data file including the specific data for the recording medium held by the holder body in a reference database of an external device, and a corresponding data file in the reference database can be identified on basis of the specific data for the holder body that is read from the inherent marking.

In the information recording medium according to the another aspect of the invention, the recording medium may be a recording tape or a recording disk. A recording method for the recording medium may be either magnetic recording or magneto-optic recording.

In the information recording medium according to the another aspect of the invention, the holder body may face on outside of the main-body case through a driving aperture opening on the main-body case, and the inherent marking may be formed on an outer surface of the holder body that faces on the outside of the main-body case.

In the information recording medium according to the another aspect of the invention, the inherent marking may be a two-dimensional code that can optically be read by a marking reader device.

In the information recording medium according to the another aspect of the invention, the inherent marking may be a two-dimensional code that can optically be read by a marking reader device from outside via the driving aperture of the main-body case.

In the information recording medium according to the another aspect of the invention, the medium unit may be composed of a tape reel contained in an inner space of the main-body case and a recording tape wound on the tape reel, the tape reel may include a pair of upper and lower flanges and a reel boss supporting both the flanges, and the inherent marking formed on an outer surface of a bottom wall of the reel boss may face on the outside of the main-body case through the driving aperture opening on the main-body case.

In the information recording medium according to the another aspect of the invention, the inherent marking may be covered with a transparent protective coat.

In the information recording medium according to the another aspect of the invention, specific data for the recording medium may include production history data and/or characteristic data.

In the information recording medium of the invention, the inherent marking for representing the specific data such as production history data and characteristic data for the medium unit is provided on the medium unit, and production history data, characteristic data, and the like for the medium unit can reliably be known by reading the inherent marking provided on the medium unit. In accordance with the invention, therefore, precise traceability for the information recording medium can be assured with reliability ensured sufficiently. As a matter of course, precise traceability for production history data, characteristic data, and the like can be assured whether the medium unit is the recording tape or the recording disk.

With the inherent marking provided on the outer surface of the medium unit that faces on the outside of the main-body case, the inherent marking can be read (or checked visually) without necessity of taking the medium unit out of the main-body case, and tape data such as production history data and characteristic data for the medium unit can be checked from the read inherent marking. On condition that failure in reading and writing occurs when the information recording medium is used on customer side, for example, examination of production history and the like can conveniently be carried out on basis of the specific data represented by the inherent marking provided on the medium unit of the information recording medium, as a matter of course. In addition, the specific data for the medium unit can be used for inspection, quality control, and the like during the production.

With the inherent marking formed of the two-dimensional code that can optically be read by the marking reader device, a significantly large amount of data can directly be represented by the inherent marking, in comparison with an inherent marking formed of a one-dimensional code such as bar code. This means that the tape data for the recording medium, e.g., the magnetic tape can directly be checked only by reading the inherent marking and, accordingly, the tape data can conveniently be checked with excellent reliability. Besides, reliability or certainty of reading by the marking reader device is improved by formation of not one but a plurality of two-dimensional codes capable of representing a large amount of data in a small area of the marking.

Provided that the inherent marking composed of the two-dimensional code is formed on the outer surface of the bottom wall of the reel boss of the tape reel on condition that the medium unit of the information recording medium is composed of the tape reel contained in the inner space of the main-body case and the recording tape wound on the tape reel, the tape data can be provided and marked without danger of mistake by provision of the inherent marking on the tape reel immediately after the tape winding process, whether the recording tape is wound by the in-cassette tape winding method or the out-cassette tape winding method. In addition, even if the tape reel has been taken out of the main-body case, the tape data such as production history data and characteristic data for the recording tape can reliably be known by reading the inherent marking provided on the tape reel. In accordance with the invention, accordingly, the precise traceability for the information recording medium can be assured with reliability ensured sufficiently.

On condition that the inherent marking is covered with the transparent protective coat, the inherent marking is prevented from being brought into direct contact with a drive shaft on the side of a drive and being damaged. In addition, the inherent marking can be read through the transparent protective coat when necessary.

In accordance with the information recording medium according to the another aspect of the invention, as necessary (on condition that the failure in reading and writing or the like occurs when the information recording medium is used on customer side, for example), the specific data for the holder body is read from the inherent marking provided on the holder body, a data file that has been associated with the specific data for the holder body and that has been stored in a reference database of an external device is thereby identified, the specific data for the recording medium that has been stored in the data file, e.g., production history data, characteristic data, and the like can be known, and thus the precise traceability for the information recording medium can be assured.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
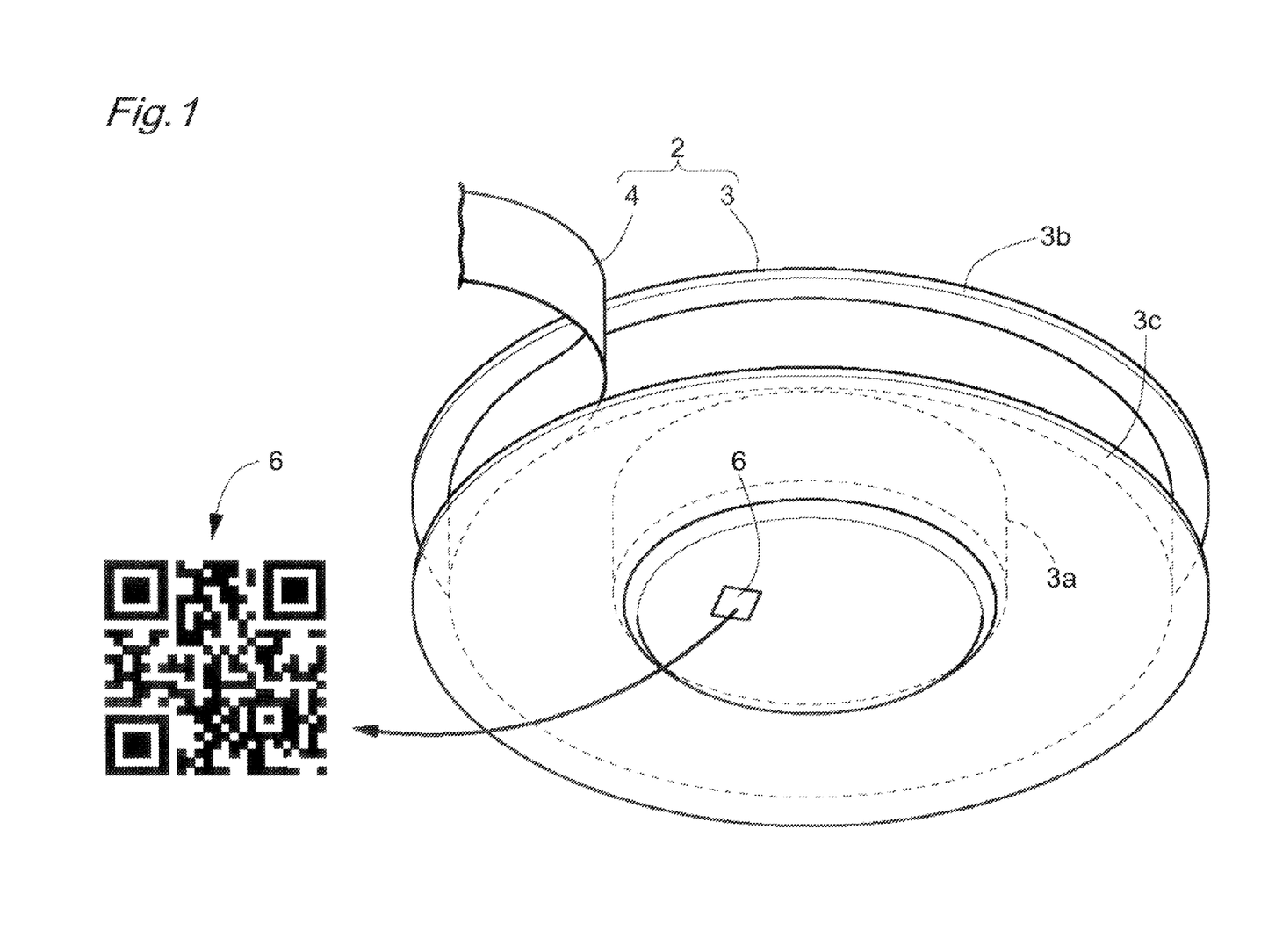
FIG. 1 is a perspective view of a tape reel, as seen looking from lower surface side.
Figure 2:
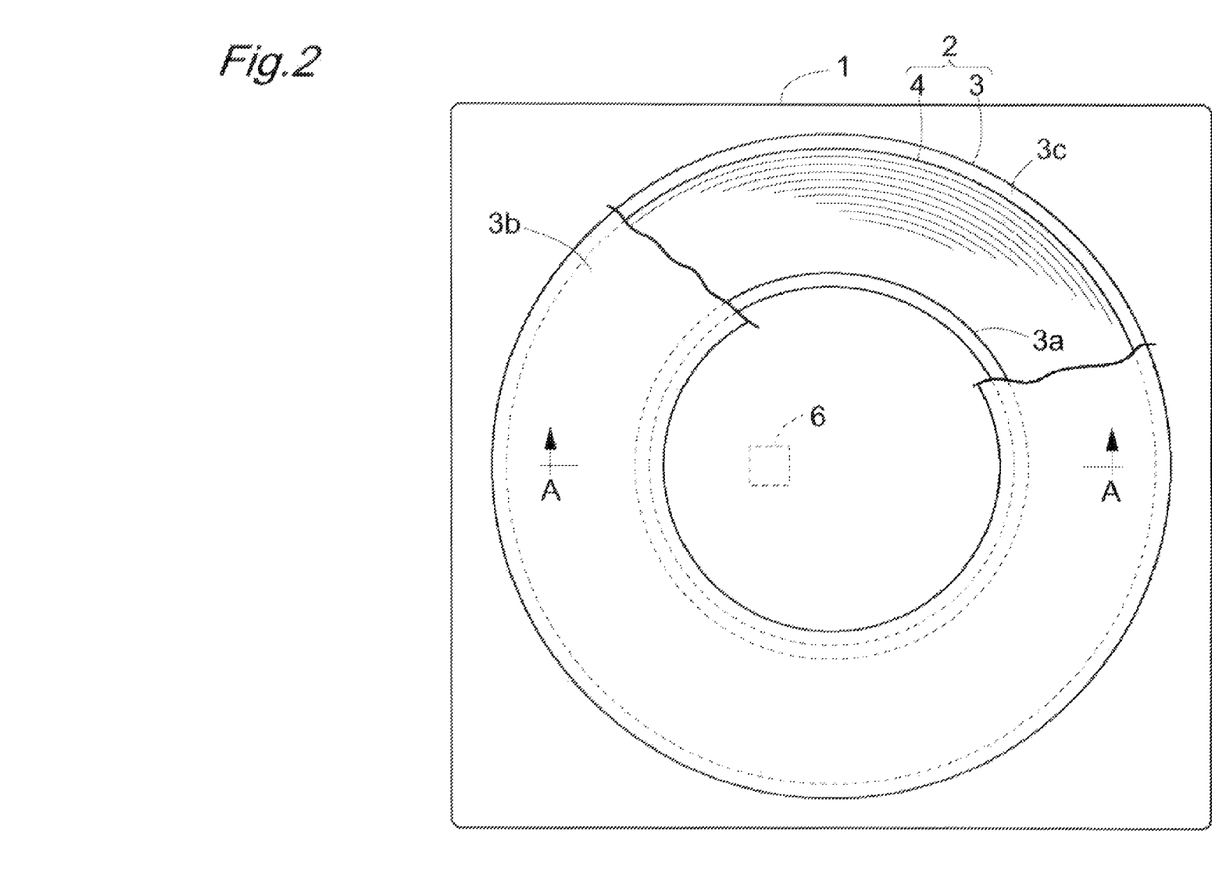
FIG. 2 is a plan view of inside of a tape cartridge.

FIGS. 1 through 4 show a tape cartridge that is a first embodiment of information recording medium of the present invention. As shown in FIG. 2, the tape cartridge is what is called a single-reel type tape cartridge in which a medium unit 2 is contained in an inner space of a main-body case 1 shaped like a square box. The medium unit 2 is composed of a tape reel 3 as a holder body and a long magnetic tape (recording tape) 4 wound and held around a reel boss 3a of the tape reel 3. Herein, the inner space of the main-body case 1 refers to a space that is inside a contour of the main-body case 1. As the recording tape, a magneto-optical tape may be substituted for the magnetic tape.

Though not shown, a leader section for pullout of the magnetic tape 4 from the case is fixed to an unreeling end of the magnetic tape 4, and a loading aperture through which the leader section is pulled out and returned opens at a front corner of the main-body case 1. The main-body case 1 made of plastic can be disassembled into an upper case and a lower case and is formed of the cases jointed like a lid and a vessel.

Figure 3:
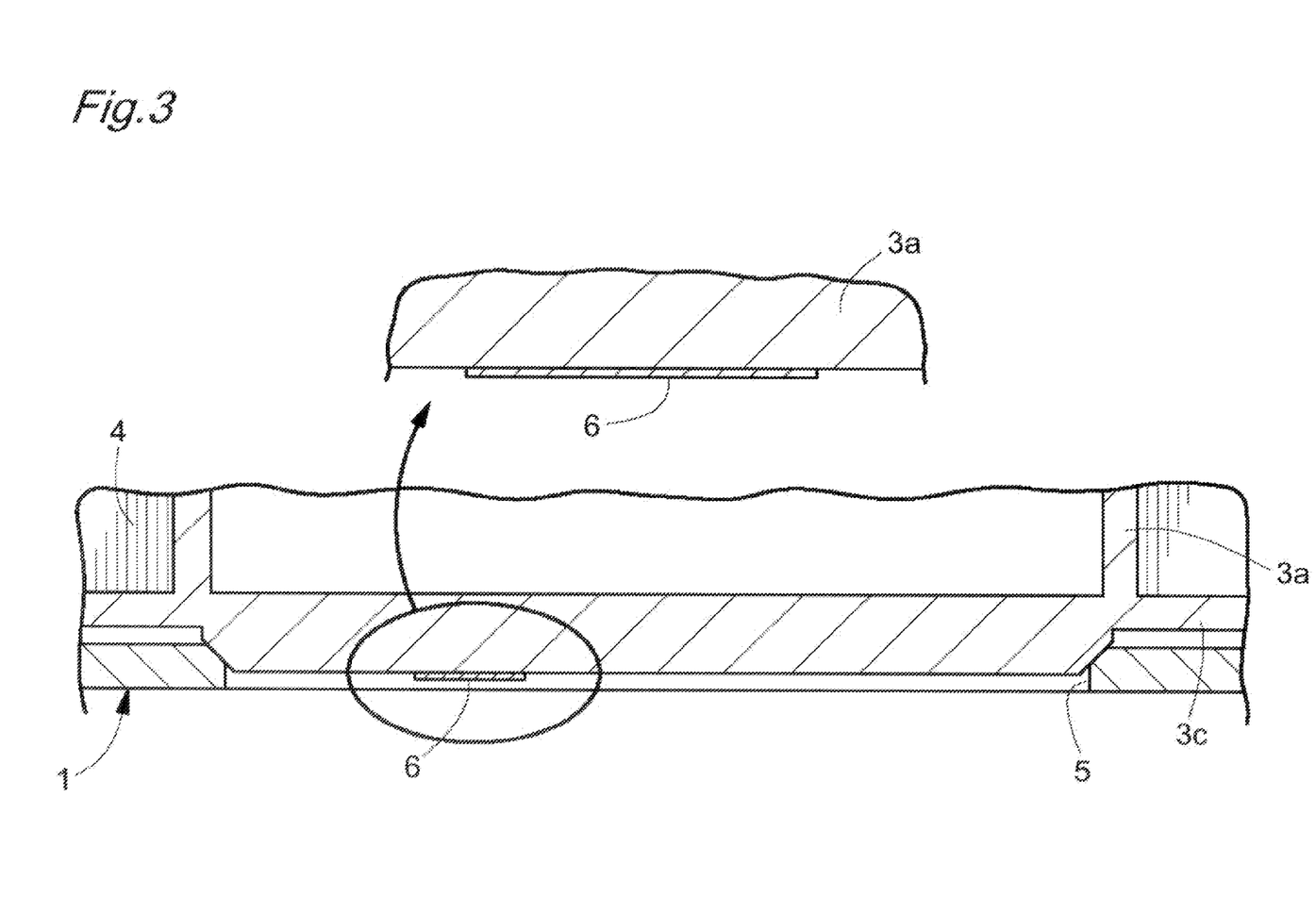
FIG. 3 is a sectional view of FIG. 2 taken along a line A-A.

As shown in FIGS. 1 and 3, the tape reel 3 is a plastic molding composed of a pair of upper and lower flanges 3b, 3c and the reel boss 3a that is shaped like a sleeve having a bottom at one end portion and that supports the upper and lower flanges 3b, 3c on the both end portions thereof. The reel boss 3a and the lower flange 3c are molded integrally, and the tape reel 3 is formed by welding and fixation of the upper flange 3b onto an upper end portion of the reel boss 3a. A reel rock mechanism is provided between an inner bottom surface of the reel boss 3a and the upper case, in order to restrict floating of the tape reel 3 that is not in use and in order to prevent slack in the magnetic tape 4. The main-body case 1, the reel-rock mechanism, and a structure for driving the tape reel 3 are the same as those of conventional well-known mechanisms, and description thereof will be omitted.

The tape reel 3 that is not in use is locked and held by the reel rock mechanism so as to be incapable of rotating and is pressed toward the lower case 1 by a spring not shown. In this state, as shown in FIG. 3, the reel boss 3a is received by opening circumference of a driving aperture 5 that opens on the lower case, and an outer surface of a bottom wall of the reel boss 3a faces outside of the main-body case 1.

In the tape cartridge having the above configuration, an inherent marking 6 for indicating tape data such as production history data and characteristic data is provided on the outer surface of the bottom wall of the reel boss 3a in order to assure precise traceability. As the inherent marking 6, there may be used an optically readable code such as bar code and two-dimensional code. Among those, as shown in FIG. 1, two-dimensional code is preferable in terms of information capacity. The inherent marking 6 composed of such two-dimensional code may be provided with use of an ink jet printer, a printer based on laser beam inscription, or the like, for instance. Among two-dimensional codes are QR code, PDF 417, Data Matrix, Maxi Code, and the like. On a worldwide basis, Maxi Code is widely used.

Figure 4:
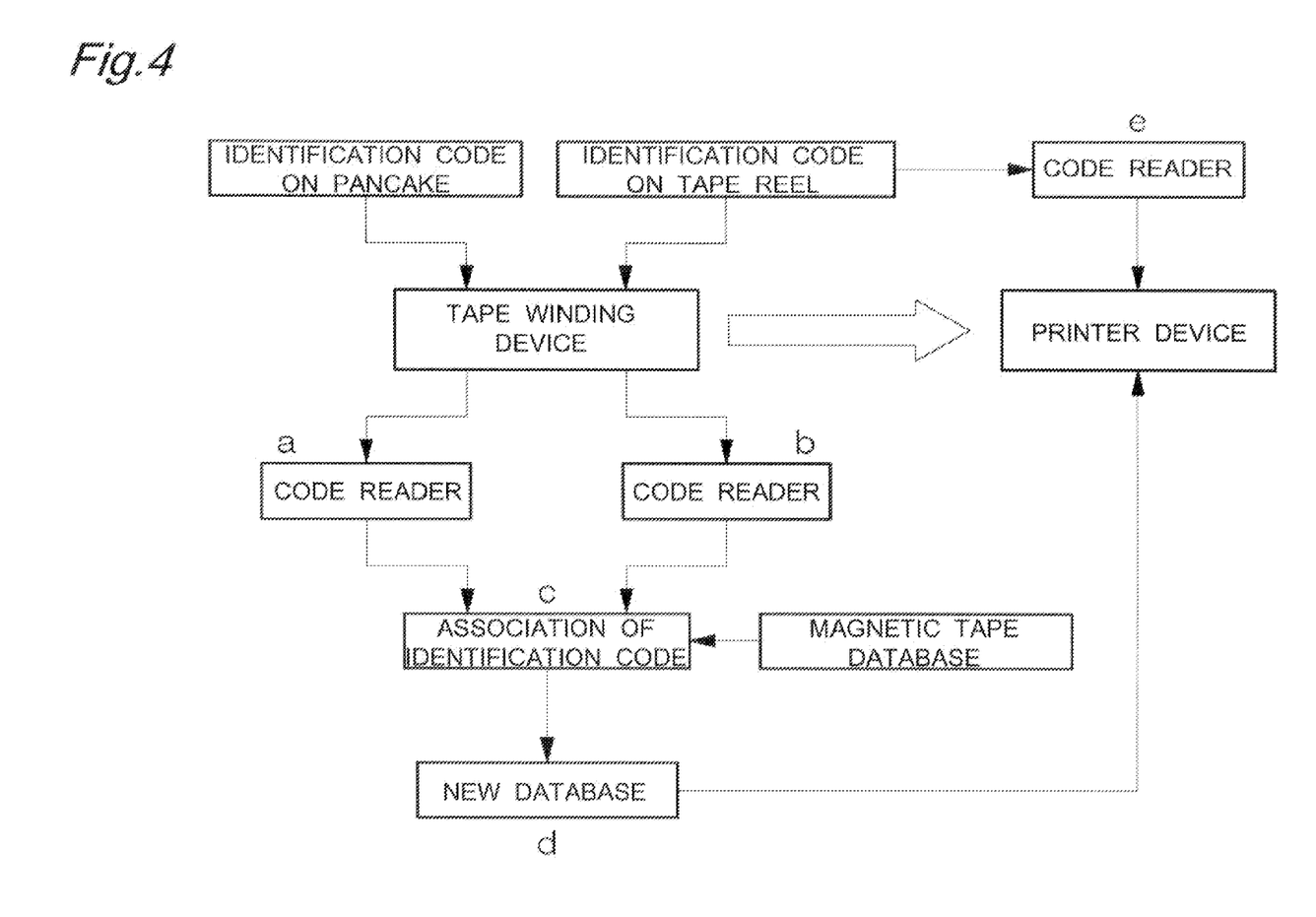
FIG. 4 is a block diagram showing a procedure for providing an inherent marking.

With reference to FIG. 4, hereinbelow will be described a procedure for providing the inherent marking 6 under a condition that the magnetic tape 4 is wound on the tape reel 3 in the out-cassette method. On the outer surface of the bottom wall of the reel boss 3a of the tape reel 3, for instance, an identification code that represents specific data of the tape reel 3 has previously been displayed by printing, inscription, or the like. The specific data represented by the identification code of the tape reel 3 includes date of manufacture and serial number of the tape reel 3, and the like, for instance.

On a tape pancake wound with original roll of the magnetic tape 4, an identification code that represents data for identification of the tape pancake is displayed by printing, bar code label, or the like. Tape data for the original roll of the magnetic tape 4 wound on the tape pancake has previously been stored in a database of a computer. The identification code displayed on the tape pancake is read and the tape pancake is thereby identified, so that the tape data as data specific to the magnetic tape 4 wound on the tape reel 3 can be known from the database.

The production history data included in the tape data for the magnetic tape 4 includes details on tape production, e.g., specifications of base film, composition of coating material that forms a magnetic layer, coating means, thickness of coating (the magnetic layer), whether finishing process has been done, condition of cutting by a slitter, dates of processes, and the like. In a tape winding device are provided a code reader for reading the identification code displayed on the tape reel 3 and a code reader for reading the identification code displayed on the tape pancake, as shown by reference characters a, b in FIG. 4.

When the tape is wound on the tape reel 3 loaded in the tape winding device, the identification code on the tape reel 3 and the identification code on the tape pancake read respectively by the code readers are associated (see reference character c). Then the tape data for the magnetic tape 4 is captured with reference to the database, and a new data file is subsequently produced for each tape reel 3 and is stored in the database (see reference character d). To the data file are added inherent number, order of winding, condition of winding, and the like of the device by which tape winding has been performed.

The tape reel 3 that has completely been wound with the magnetic tape 4, together with other components, is incorporated into the main-body case 1, so that the tape cartridge is finished. For the tape cartridge, subsequently, characteristics of the magnetic tape 4 are measured, characteristic data of the magnetic tape 4 which data has been obtained therein is added to the data file, and contents of the file are then updated. The characteristic data of the magnetic tape 4 includes electromagnetic transduction characteristics such as output, output-noise ratio, and error rate.

The tape cartridge for which the characteristic measurement has been completed is transferred to a printer device for printing the inherent marking 6. The printer device has a code reader (see reference character e) for reading the identification code of the tape reel 3. The identification code of the tape reel 3 is read by the code reader, so that the contents of the data file described above can be known by the printer device. Then a two-dimensional code is printed according to the contents, so that the inherent marking 6 can be provided and displayed on the tape reel 3 without danger of mistake.

The tape cartridge on which the inherent marking 6 has been printed is individually packaged and is then shipped. Provided that the inherent marking 6 displayed on the outer surface of the bottom wall of the reel boss 3a is read by a marking reader device before the packaging, examination of the tape data during sampling inspection, management of delivery and inventory, and the like can be carried out in addition to quality control on tape cartridge. On condition that failure in reading and writing or the like occurs when the tape cartridge is used on customer side, tape data such as production history data and characteristic data for the magnetic tape 4 can be known by reading the inherent marking 6 with the marking reader device. As a result, precise traceability for tape cartridge can be assured with high reliability.

Under a condition that the magnetic tape 4 is wound on the tape reel 3 in the in-cassette method, the identification code of the tape reel 3 has previously been displayed on the outer surface of the bottom wall of the reel boss 3a. When the tape reel 3 having been incorporated into the main-body case 1 is loaded in the tape winding device and then the tape is wound on the tape reel 3, the identification code of the tape reel 3 and the identification code of the tape pancake read respectively by the code readers are associated in the same manner as above. Then a new data file is produced for each tape reel 3 and is stored in the database. After that, the tape data and the characteristic data for the magnetic tape 4 are added to the data file, and contents of the file are updated in the same manner as in the out-cassette method described above. The tape cartridge into which the tape has completely been wound is transferred to the printer device for printing the inherent marking 6.

In the printer device is provided the code reader for reading the identification code of the tape reel 3. The identification code of the tape reel 3 is read by the code reader, so that the contents of the data file described above can be known by the printer device. Then a two-dimensional code is printed according to the contents, so that the inherent marking 6 can be provided and displayed on the tape reel 3 without danger of mistake.

Figure 5:
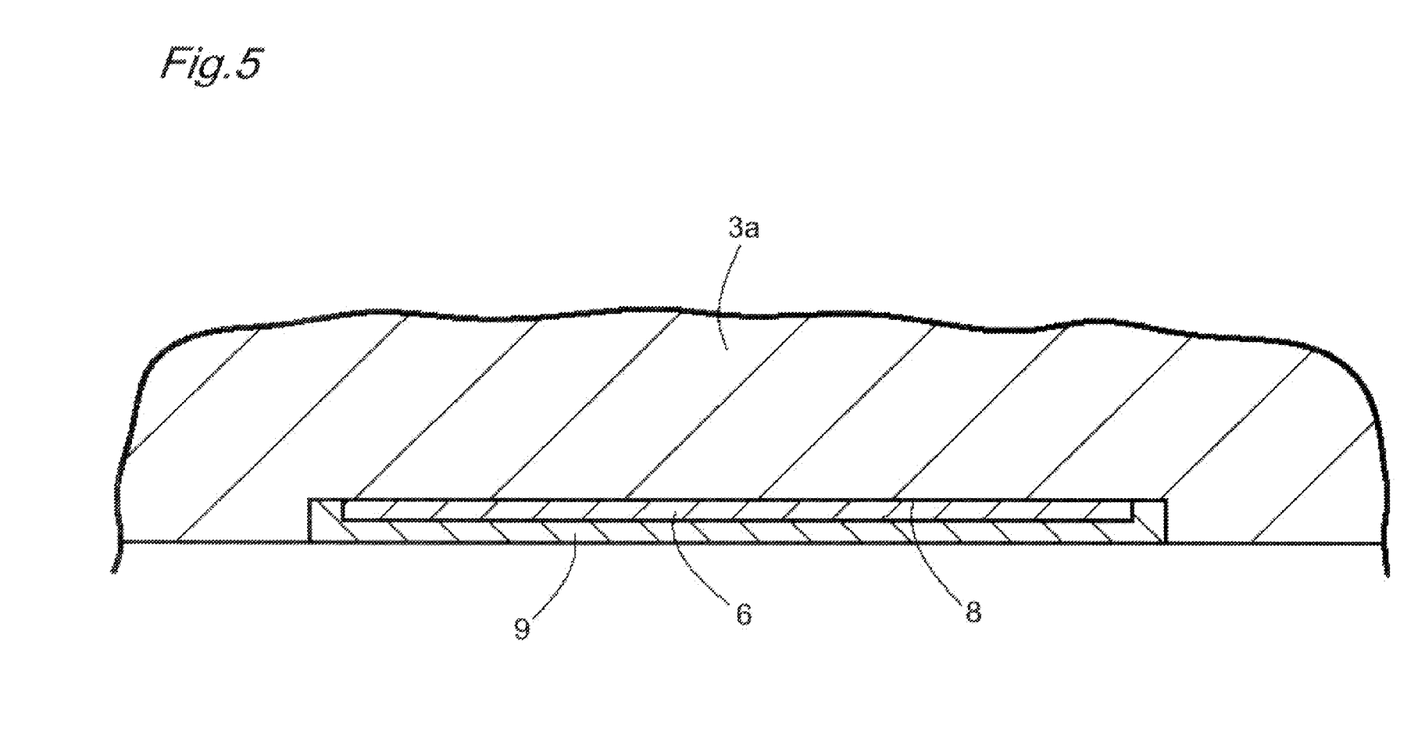
FIG. 5 is a sectional view showing another embodiment of an inherent marking.

An overall outside surface of the inherent marking 6 may be covered with a transparent protective coat in order that part of the marking 6 may be prevented from being peeled or damaged by contact with a drive shaft of a tape drive. As shown in FIG. 5, a shallow recess 8 may be formed on the outer surface of the bottom wall of the reel boss 3a, the inherent marking 6 may be printed on a recessed surface of the recess 8, and the overall outside surface of the marking 6 may be covered with a transparent protective coat 9.

Figure 6:
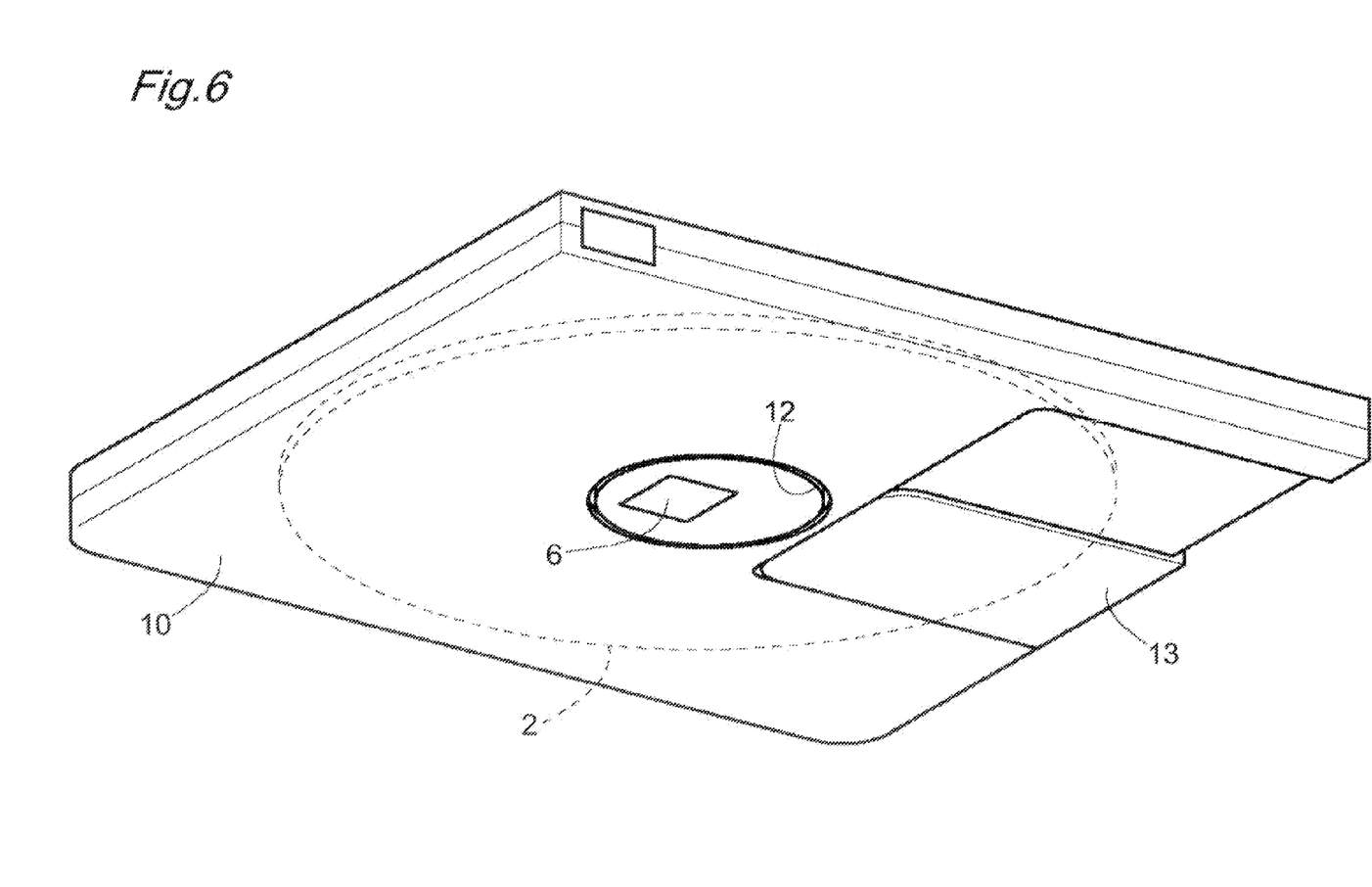
FIG. 6 is a perspective view showing another embodiment of information recording medium.

FIG. 6 shows a magneto-optical disk cartridge that is a second embodiment of information recording medium of the invention. The magneto-optical disk cartridge is composed of a disk-like medium unit 2 that is contained in an inner space of a main-body case 10 shaped like a square box. The medium unit 2 is composed of a magneto-optical disk (recording medium and recording disk) on which information signals are to be recorded and a center part (holder body) which holds the magneto-optical disk. The center part of the medium unit 2 faces on outside of the main-body case 10 through a driving aperture 12 that opens on the main-body case 10. Reading and writing of information signals on the magneto-optical disk of the recording disk 2 is performed in a state in which a window for reading and writing is opening by a slide of a shutter 13 attached to outer surfaces of the main-body case 10.

In order to assure precise traceability for the magneto-optical disk cartridge having the above configuration, an inherent marking 6 for displaying specific data for the medium unit is provided on the outer surface of the center part of the medium unit 2 that faces the driving aperture 12. To the inherent marking 6 is applied QR code described above. The specific data for the medium unit that is represented by the inherent marking 6 includes disk data such as production history data and characteristic data, data of manufacture, serial number and the like of the magneto-optical disk, for instance.

In accordance with the magneto-optical disk cartridge having the above configuration, the inherent marking 6 is directly read by a marking reader device, and thus examination of the disk data during sampling inspection, management of delivery and inventory, and the like can be carried out in addition to quality control on the magneto-optical disk cartridge. On condition that failure in reading and writing or the like occurs when the magneto-optical disk cartridge is used on customer side, disk data such as production history data and characteristic data for the magneto-optical disk can be known by reading the inherent marking 6 with the marking reader device. As a result, precise traceability for magneto-optical disk cartridge can be assured with high reliability.

In the first and second embodiments, tape data or disk data is included in the specific data that is represented by the inherent marking 6. The inherent marking 6, however, may represent specific data that is intended solely for specifying a holder body for holding the recording tape or the recording disk. In such a configuration, the specific data represented by the inherent marking 6 is indexed, and contents of the data file corresponding to the specified holder are checked on a computer. As a result, precise traceability for tape cartridge or magneto-optical disk cartridge can be assured with high reliability.

Figure 7:
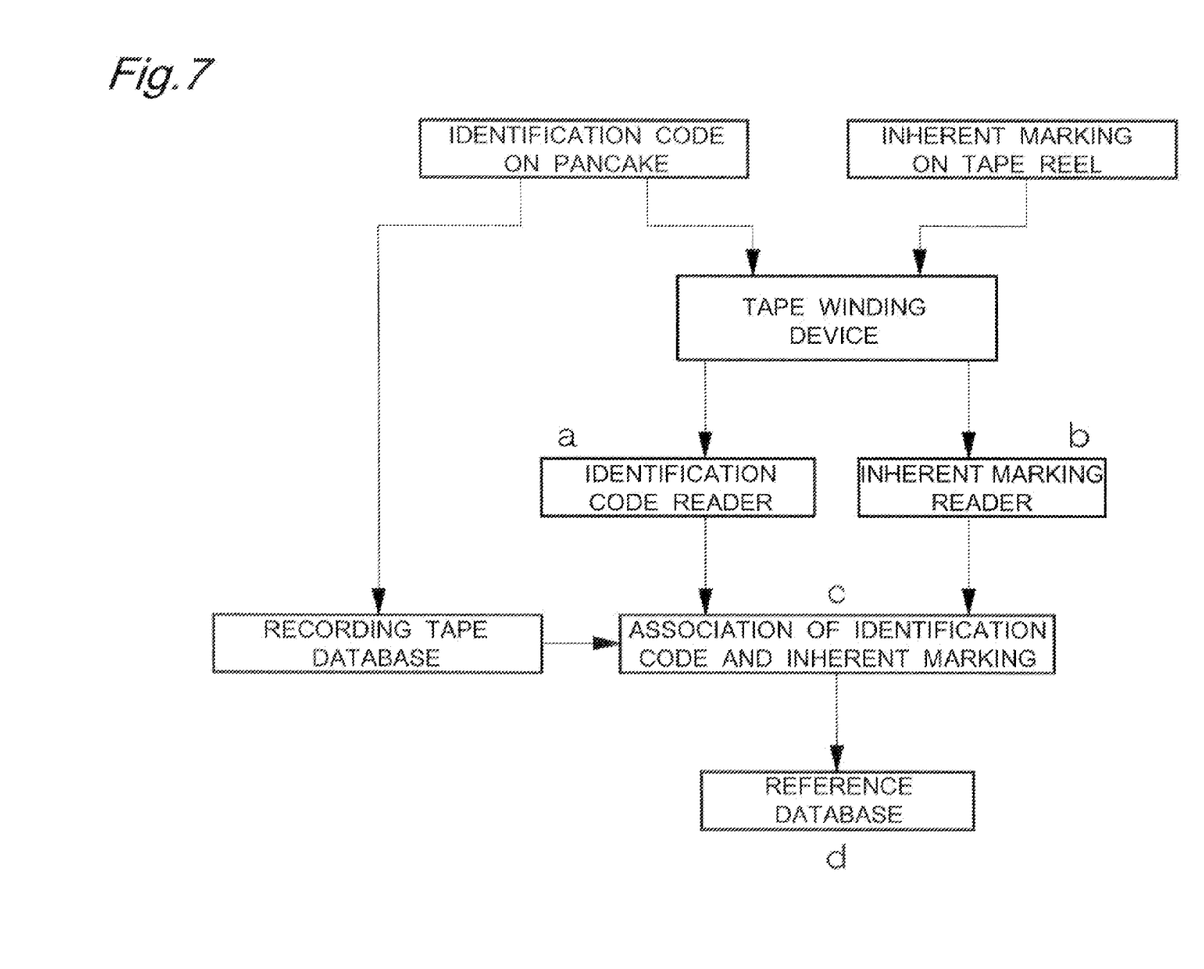
FIG. 7 is a block diagram showing a procedure for constructing a reference database.

Hereinbelow, a traceability system for information recording medium of the invention will be described with use of the tape cartridge as an example. In this embodiment, as shown in FIG. 7, a reference database for assuring traceability is constructed in a computer that is an external device. In a process in which the recording tape 4 is wound on the tape reel 3 by the tape winding device, the identification code on the tape pancake and the inherent marking 6 that has previously been provided on the tape reel 3 and that represents the specific data intended solely for specifying the tape reel 3 are read by the identification code reader and the inherent marking reader, respectively, and are associated in order to produce a new data file. Then the tape data, such as production history data (and/or characteristic data) for the tape pancake, which data has previously been stored in the recording tape database in the computer is added to the data file, and contents of the file are updated to be stored into the reference database.

With the data file stored in the reference database, the inherent marking 6 provided on the tape reel 3 is read by the inherent marking reader as occasion demands, the specific data for the tape reel 3 that is represented by the inherent marking 6 is indexed, and the corresponding data file stored in the reference database is identified. As a result, production history data, characteristic data and the like for the medium unit 2 can be examined and traceability for tape cartridge can be assured.

With reference to FIGS. 1, 2, 3, and 7, hereinbelow will be described a management system in a condition that the magnetic tape 4 is wound on the tape reel 3 in the out-cassette method. On the outer surface of the bottom wall of the reel boss 3a of the tape reel 3, the inherent marking 6 is provided, for example, as a two-dimensional code by printing or inscription. The specific data represented by the inherent marking 6 includes date of manufacture and serial number of the tape reel 3, and the like, for instance. On the tape pancake wound with original roll of the magnetic tape 4, an identification code is provided by printing, bar code label, or the like. Tape data such as production history data and characteristic data for the magnetic tape 4 wound on the tape pancake has previously been stored in the database of the computer. Thus the tape data for the magnetic tape 4 wound on the tape reel 3 can be identified by reading the identification code on the tape pancake.

The production history data for the recording medium 4 includes details on tape production, e.g., specifications of base film, composition of coating material that forms a magnetic layer, coating means, thickness of coating (the magnetic layer), whether finishing process has been done, condition of cutting by a slitter, dates of processes, and the like. The characteristic data for the recording tape 4 includes electromagnetic transduction characteristics such as output, output-noise ratio, and error rate.

In the tape winding device are provided an inherent marking reader for reading the inherent marking 6 displayed on the tape reel 3 and an identification code reader for reading the identification code displayed on the tape pancake, as shown by reference characters a, b in FIG. 7. When the tape is wound on the tape reel 3 loaded in the tape winding device, the inherent marking 6 on the tape reel 3 and the identification code on the tape pancake read respectively by the inherent marking reader and the identification code reader are associated (see reference character c). Then a new data file is produced for each tape reel 3 and is stored in the reference database (see reference character d). To the data file is added the tape data, such as production history data (and/or characteristic data) for original roll tape wound on the tape pancake, which data has previously been stored in the recording tape database in the computer. To the data file are also added inherent number, order of winding, condition of winding, and the like of the device by which tape winding has been performed. Thus contents of the file are updated to be stored into the reference database. The tape reel 3 that has completely been wound with the tape is transferred to an assembly process for incorporation into the main-body case 1. Therein, the tape reel 3 together with other components is incorporated into the main-body case 1, so that the tape cartridge is finished.

The tape cartridge assembled completely is individually packaged and is then shipped. Provided that the inherent marking 6 displayed on the outer surface of the bottom wall of the reel boss 3a is read by the marking reader device before the packaging, examination of the recording tape 4 during sampling inspection, management of delivery and inventory, and the like can be carried out in addition to quality control on tape cartridge. On condition that failure in reading and writing or the like occurs when the information recording medium is used on customer side, precise traceability for tape cartridge can be assured with high reliability by reading the inherent marking 6 with the inherent marking reader.

Under a condition that the recording tape 4 is wound on the tape reel 3 in the in-cassette method, the inherent marking 6 of the tape reel 3 has previously been displayed on the outer surface of the bottom wall of the reel boss 3a by printing, inscription or the like. When the tape is wound into the main-body case 1 in which the tape reel 3 has been incorporated and which has been loaded in the tape winding device, the inherent marking 6 and the identification code of the tape pancake read respectively by the inherent marking reader and the identification code reader are associated in the same manner as above. Then a new data file is produced for each tape reel 3. After that, the tape data and the like are added to the data file, which is subsequently stored in the reference database. The tape cartridge is finished when tape winding is completed.

As for the embodiment, an example in which the recording medium is the recording tape has been described. The invention, however, can be applied to a configuration in which the recording medium is a recording disk.

In the above embodiments, the inherent marking 6 can be formed by methods other than printing and inscription. For instance, an area where the inherent marking 6 is to be formed may be made to have a mirror surface, a black coating layer that resists reflection may be formed on the surface, and unnecessary part of the black coating layer may be removed by laser beam so that the inherent marking 6 may be produced.

The inherent marking 6 is preferably formed on the surface of the tape reel 3 facing the outer surface of the main-body case 1, as described above. The marking 6, however, may be formed in an arbitrary position on the surface of the tape reel 3, e.g., on an outer surface of the upper flange 3b or the lower flange 3c or the like. In such a configuration, the inherent marking 6 cannot be read unless the tape reel 3 is taken out of the main-body case 1. Such a configuration, however, is sufficiently useful for assuring traceability for tape cartridge that might be involved by failure in reading and writing or the like in use of the medium. Provided that a window composed of transparent material is formed on a wall surface of the main-body case 1 facing the inherent marking 6, the inherent marking 6 can be read without necessity of taking the tape reel 3 out of the main-body case 1. Besides, such a configuration is advantageous in that the inherent marking 6 can thereby be protected.

Although the present invention has been fully described by way of examples with reference to the accompanying drawings, it is to be noted that various changes and modifications will be apparent to those skilled in the art. Therefore, unless otherwise such changes and modifications depart from the spirit and the scope of the present invention, they should be construed as being included therein.

What is claimed is:

1. Information recording medium comprising:
a medium unit on which information signals are to be recorded; and
a main-body case in which the medium unit is placed in an inner space thereof, wherein
an inherent marking for representing specific data for the medium unit is provided on the medium unit.

2. Information recording medium as claimed in claim 1, wherein the medium unit includes recording medium on which information signals are to be recorded and a holder body which holds the recording medium, and the inherent marking is provided on the holder body.

3. Information recording medium as claimed in claim 2, wherein the recording medium is a recording tape or a recording disk.

4. Information recording medium as claimed in claim 2, wherein the holder body faces on outside of the main-body case through a driving aperture opening on the main-body case, and the inherent marking is formed on an outer surface of the holder body that faces on the outside of the main-body case.

5. Information recording medium as claimed in claim 1, wherein the inherent marking is a two-dimensional code that can optically be read by a marking reader device.

6. Information recording medium as claimed in claim 4, wherein the inherent marking is a two-dimensional code that can optically be read by a marking reader device from outside via the driving aperture of the main-body case.

7. Information recording medium as claimed in claim 1, wherein the medium unit is composed of a tape reel contained in an inner space of the main-body case and a recording tape wound on the tape reel, the tape reel includes a pair of upper and lower flanges and a reel boss supporting both the flanges, and the inherent marking formed on an outer surface of a bottom wall of the reel boss faces on the outside of the main-body case through the driving aperture opening on the main-body case.

8. Information recording medium as claimed in claim 1, wherein the inherent marking is covered with a transparent protective coat.

9. Information recording medium as claimed in claim 2, wherein specific data for the medium unit that is represented by the inherent marking includes specific data for the holder body and specific data for the recording medium.

10. Information recording medium as claimed in claim 9, wherein the specific data for the recording medium includes production history data and/or characteristic data.

11. Information recording medium comprising:
a medium unit composed of recording medium on which information signals are to be recorded and a holder body which holds the recording medium; and
a main-body case in which the medium unit is placed in an inner space thereof, wherein
an inherent marking is provided on the holder body, the inherent marking represents specific data for the holder body, specific data for the recording medium is associated with the specific data for the holder body and is stored as a data file including the specific data for the recording medium held by the holder body in a reference database of an external device, and a corresponding data file in the reference database can be identified on basis of the specific data for the holder body that is read from the inherent marking.

12. Information recording medium as claimed in claim 11, wherein the recording medium is a recording tape or a recording disk.

13. Information recording medium as claimed in claim 11, wherein the holder body faces on outside of the main-body case through a driving aperture opening on the main-body case, and the inherent marking is formed on an outer surface of the holder body that faces on the outside of the main-body case.

14. Information recording medium as claimed in claim 11, wherein the inherent marking is a two-dimensional code that can optically be read by a marking reader device.

15. Information recording medium as claimed in claim 13, wherein the inherent marking is a two-dimensional code that can optically be read by a marking reader device from outside via the driving aperture of the main-body case.

16. Information recording medium as claimed in claim 11, wherein the medium unit is composed of a tape reel contained in an inner space of the main-body case and a recording tape wound on the tape reel, the tape reel includes a pair of upper and lower flanges and a reel boss supporting both the flanges, and the inherent marking formed on an outer surface of a bottom wall of the reel boss faces on the outside of the main-body case through the driving aperture opening on the main-body case.

17. Information recording medium as claimed in claim 11, wherein the inherent marking is covered with a transparent protective coat.

18. Information recording medium as claimed in claim 11, wherein the specific data for the recording medium includes productions history data and/or characteristic data.

* * * * *

UNITED STATES PATENT AND TRADEMARK OFFICE
CERTIFICATE OF CORRECTION

PATENT NO. : 7,594,241 B2  Page 1 of 1
APPLICATION NO. : 11/453909
DATED : September 22, 2009
INVENTOR(S) : Hasegawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Twenty-eighth Day of September, 2010

David J. Kappos
*Director of the United States Patent and Trademark Office*